United States Patent
Serebryakov et al.

(10) Patent No.: US 11,774,956 B2
(45) Date of Patent: Oct. 3, 2023

(54) ANOMALOUS BEHAVIOR DETECTION BY AN ARTIFICIAL INTELLIGENCE-ENABLED SYSTEM WITH MULTIPLE CORRELATED SENSORS

(71) Applicant: HEWLETT PACKARD ENTERPRISE DEVELOPMENT LP, Houston, TX (US)

(72) Inventors: Sergey Serebryakov, Milpitas, CA (US); Tahir Cader, Liberty Lake, WA (US); Deepak Nanjundaiah, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 259 days.

(21) Appl. No.: 17/207,540

(22) Filed: Mar. 19, 2021

(65) Prior Publication Data
US 2022/0299985 A1    Sep. 22, 2022

(51) Int. Cl.
*G05B 23/02* (2006.01)
*G06N 20/00* (2019.01)

(52) U.S. Cl.
CPC ....... *G05B 23/0235* (2013.01); *G05B 23/024* (2013.01); *G05B 23/0262* (2013.01); *G05B 23/0297* (2013.01); *G06N 20/00* (2019.01)

(58) Field of Classification Search
CPC .............. G05B 23/0235; G05B 23/024; G05B 23/0262; G05B 23/0297; G06N 20/00
See application file for complete search history.

(56) References Cited

U.S. PATENT DOCUMENTS

2019/0057317 A1*  2/2019  Malhotra ............. G05B 23/024

OTHER PUBLICATIONS

Yi-Bing Lin et al., SensorTalk: An IoT Device Failure Detection and Calibration Mechanism for Smart Farming, Sensors, Nov. 4, 2019, 22 pgs., website accessed Mar. 11, 2021, https://www.ncbi.nlm.nih.gov/pmc/articles/PMC6864446/, MDPI, Basel, Switzerland.

* cited by examiner

*Primary Examiner* — Manuel A Rivera Vargas
(74) *Attorney, Agent, or Firm* — Sheppard Mullin Richter & Hampton LLP

(57) ABSTRACT

Multi-metric artificial intelligence (AI)/machine learning (ML) models for detection of anomalous behavior of a machine/system are disclosed. The multi-metric AI/ML models are configured to detect anomalous behavior of systems having multiple sensors that measure correlated sensor metrics such as coolant distribution units (CDUs). The multi-metric AI/ML models perform the anomalous system behavior detection in a manner that enables both a reduction in the amount of sensor instrumentation needed to monitor the system's operational behavior as well as a corresponding reduction in the complexity of the firmware that controls the sensor instrumentation. As such, AI-enabled systems and corresponding methods for anomalous behavior detection disclosed herein offer a technical solution to the technical problem of increased failure rates of existing multi-sensor systems, which is caused by the presence of redundant sensor instrumentation that necessitates complex firmware for controlling the sensor instrumentation.

18 Claims, 6 Drawing Sheets

ANOMALOUS BEHAVIOR DETECTION BY AN ARTIFICIAL INTELLIGENCE-ENABLED SYSTEM WITH MULTIPLE CORRELATED SENSORS

STATEMENT OF GOVERNMENT INTEREST

This invention was made with United States Government assistance under Contract No. DE-AC36-08GO28308 awarded by the National Renewable Energy Laboratory (NREL). The United States government has certain rights in this invention.

DESCRIPTION OF RELATED ART

A system may include multiple sensors configured to monitor an operational status of the system. The metrics measured by the sensors may be correlated with one another. For example, a first sensor metric measured by a first sensor may be directly related to a second sensor metric measured by a second sensor, such that if the first sensor detects an increase or decrease in the first sensor metric, the second sensor may also register a corresponding increase or decrease in the second sensor metric, or vice versa.

Coolant distribution units (CDUs) are one such type of system that includes multiple correlated sensors. CDUs are widely deployed at customer sites along with liquid-cooled high-performance computing (HPC) clusters. Typically, HPC systems are supported by multiple CDUs, such that if a particular CDU fails, a portion of the HPC system supported by that CDU may shut down, but remaining portions of the HPC system may continue to function. For some HPC systems, however, that may include, for example, isolated loops where a single CDU supports multiple racks, and in the absence of redundant CDUs (which customers are often reluctant to deploy due to the added cost), if the CDU fails, the racks that rely on the CDU for its cooling functionality will shut down.

To increase CDU resiliency, numerous sensors, and in many cases redundant sensors, may be provided to allow for extensive monitoring and data collection from a CDU. Counterintuitively, however, the increased complexity of the CDU and its firmware resulting from this increased sensor instrumentation can lead to increased failure rates for deployed CDUs due to failure of sensors, firmware, control systems, and the like.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Example embodiments of the invention relate to, among other things, systems, methods, computer-readable media, techniques, and methodologies that employ multi-metric artificial intelligence (AI)/machine learning (ML) models for detection of anomalous behavior of a machine/system. More specifically, example embodiments of the invention relate to the use of multi-metric AI/ML models to detect anomalous behavior of systems having multiple sensors that measure correlated sensor metrics (e.g., coolant distribution units (CDUs)), where the anomalous behavior detection is performed in a manner that enables a reduction in the amount of sensor instrumentation needed to monitor the system's operational behavior and that enhances system resiliency via rapid and scalable anomaly detection.

In particular, AI-enabled systems and corresponding methods for anomalous behavior detection disclosed herein offer a technical solution to the technical problem of increased failure rates of multi-sensor systems such as CDUs caused by the increased system and firmware complexity that results from increased sensor instrumentation. This technical solution is achieved by using AI/ML multi-metric models to perform highly scalable, automatic, and high-speed anomaly detection for a single machine/system deployment and/or across multiple deployments within a cluster such that the complexity of the sensor instrumentation can be reduced, which in turn, results in more simplified firmware for controlling the instrumentation. Reduced complexity of the sensor instrumentation can be achieved, for example, through a reduction in the number of sensors (e.g., reducing the level of redundancy for one or more types of sensors) and/or through the use of lower-cost sensors. Fewer sensors also leads to simplified, more reliable, and lower cost controls hardware for controlling the sensors. The reduced complexity of the sensor instrumentation and the corresponding reduction in the complexity of the software, firmware, and hardware needed to control operation of such instrumentation yields the technical benefit of reduced system failure rates.

Figure 1:
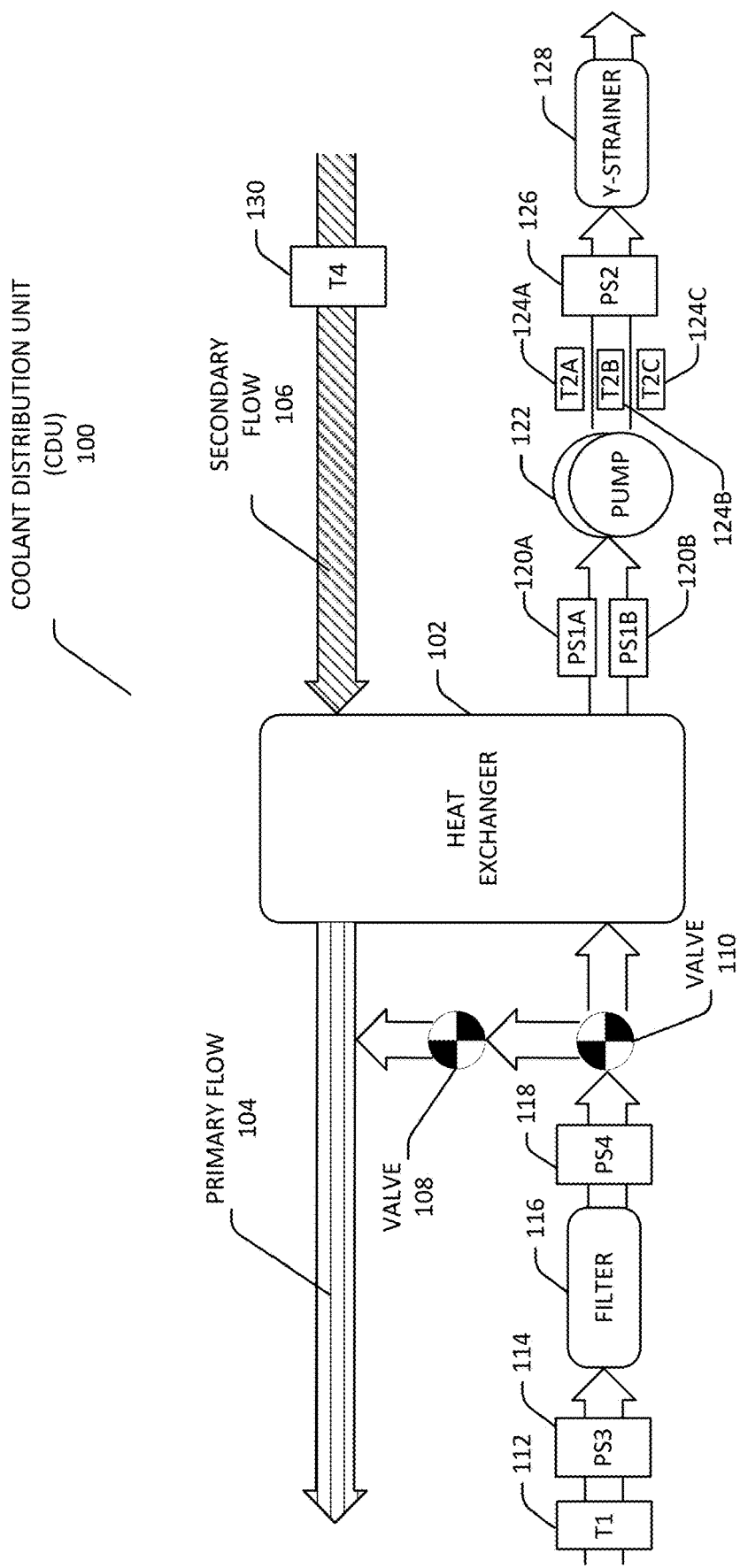
FIG. 1 depicts an example configuration of a coolant distribution unit (CDU) including multiple correlated sensors configured to monitor an operational behavior of the CDU according to example embodiments of the invention.

Referring now to illustrative embodiments of the invention, FIG. 1 depicts an example configuration of a coolant distribution unit (CDU) 100 including multiple groups of correlated sensors configured to monitor an operational behavior of the CDU 100. The CDU 100 may provide a cooling function to liquid-cooled servers within a deployment environment, for example. Th CDU 100 includes various types of components including, without limitation, mechanical components, electrical components, sensing and control components, fluid flow regulating components, and heat exchange components. The primary functions of the CDU 100 are to 1) isolate coolant provided to information technology (e.g., server) racks from water at a facility at which the servers are deployed (which is typically dirty) and 2) transfer heat from the IT racks to the facility's cooling plant.

The fluid flow regulating components of the CDU 100 include, for example, pumps (e.g., pump 122), variable frequency drives (not shown), valves (e.g., valve 108, valve 110), and so forth. These fluid flow regulating components operate to circulate both a coolant and facility water through a heat exchanger 102 of the CDU 100 in respective isolated loops. The heat exchanger 102 may transfer heat from the IT's coolant loop to the facility water in order to enable the coolant to provide the necessary cooling function to the IT racks. The sensing components include, for example, temperature sensors, flow meters, pressure (and pressure drop) sensors, and so forth.

The components of the CDU 100 depicted to the left side of the heat exchanger 102 correspond to a primary (facility) side, while the components of the CDU 100 depicted to the right side of the heat exchanger 102 correspond to a secondary (server or information technology (IT)) side. The primary side includes the primary fluid flow 104 of the deployment facility's "dirty" water as well as various components for sensing fluid parameters (e.g., temperature, pressure, etc.); regulating fluid flow (e.g., valves); filtering contaminants from the primary fluid flow 104 prior to introduction to the heat exchanger 102; and so forth. For example, the control valve 110 regulates fluid flow through the heat exchanger 102. Further, in example embodiments, valve 108—which is typically shut—allows for the CDU 100 to bypass flow past the heat exchanger 102. Similarly, the secondary side includes the secondary fluid flow 106 through the IT racks as well as fluid parameter sensing components, fluid flow regulating components (e.g., pump 122); and so forth.

From a thermal standpoint, the primary sensor metrics measured with respect to the CDU's 100 operation include coolant temperature, flow rate, pressure, and pressure drop. In addition, electrical metrics such as current and voltage are measured as well as control variables such as signals to and from variable frequency drives. Conventionally, instrumentation plays a critical role in ensuring that a CDU runs smoothly and reliably. As such, considerable investment is made in the instrumentation and associated firmware of a CDU. Moreover, redundant instrumentation is typically employed. For instance, multiple temperature sensors (e.g., thermocouples) can be used to measure coolant water temperature prior to (not shown in FIG. 1) and after operation of the pump 122 as well as prior to and after the heat exchanger 102 (not shown in FIG. 1). For example, multiple redundant thermocouples T2A 124A, T2B 124B, and T2C 124C that each measure the temperature of the coolant after the pump 122 (i.e., the temperature of the coolant delivered to the IT racks) may be provided. The individual temperature readings from the redundant temperature sensors 124A, 124B, 124C may be aggregated (e.g., averaged), or some other statistical quantity (e.g., median), may be derived from the multiple readings to obtain a composite/derived temperature reading. Other types of sensors may also be redundantly provided. For instance, multiple pressure sensors PS1A 120A and PS1B 120B may be provided on the secondary side.

Referring now to additional instrumentation depicted in FIG. 1, the primary side may further include various temperature and pressure sensors such as a thermocouple 112 and a pressure sensor 114 positioned prior to the filter 116 as well as a pressure sensor 118 positioned after the filter 116. The temperature reading from the thermocouple 112 may be used to monitor an operational status of pumps, cooling towers, or the like on the primary side. If the temperature T1 measured by the thermocouple 112 is too high, it becomes difficult to maintain a target temperature for the coolant on the secondary side, which can ultimately lead to shutdown or failure of the IT racks if the temperature on the secondary side becomes too high. The combination of the pressure sensor 118 and the pressure sensor 114 is employed to measure the pressure drop across the filter 116. If the pressure drop exceeds a specified threshold, maintenance can be scheduled for the filter 116.

Further, in addition to the redundant pressure sensor 120 and the redundant thermocouple 124, the secondary side may also include a pressure sensor 126 to measure a pressure of the coolant after the pump 122; a y-strainer 128 configured to mechanically remove unwanted solids from the coolant by means of a perforated or wire mesh straining element; a thermocouple 130 that measures a temperature of the coolant leaving the IT racks; and so forth. It should be appreciated that the various components depicted in FIG. 1 as part of the CDU 100 (whether at the primary side or the secondary side) are not exhaustive and that the CDU 100 may include additional mechanical components, electrical components, sensing and control components, fluid flow regulating components, and/or heat exchange components beyond those depicted.

Referring now in more detail to the CDU's 100 operation, generally speaking, the CDU 100 may attempt to maintain a target temperature at the secondary side. For example, the CDU 100 may attempt to maintain an average temperature reading of the individual temperature readings of thermocouples T2A, T2B, and T2C that is within a certain desired range. In example embodiments, the valve 110 may regulate the flow of water through the heat exchanger 102 in order to maintain a desired target temperature for the coolant supplied to the IT racks as determined, for example, based on the reading from thermocouple 124. If, for example, the temperature measured by thermocouple 130 increases—indicating, for example, an increase in load for the IT racks serviced by the CDU 100—this could ultimately cause the coolant temperature measured by the thermocouples 124A, 124B, 124C after the pump 122 to rise outside of the desired range. To address this, the valve 110 can be controlled to allow more fluid flow into the heat exchanger 102 to provide increased heat transfer from the coolant, thereby lowering the coolant temperature and ensuring that the temperature measured by thermocouples 124A, 124B, 124C is within the desired range. Conversely, if the coolant temperature measured by the thermocouple 130 decreases—indicating, for example, a decrease in the load on the IT racks—then the valve 110 may be controlled to reduce the fluid flow to the heat exchanger 102 to cause the coolant temperature to rise.

The CDU 100, as is the case with any data center subsystem, includes groups of sensors that are closely correlated. Stated another way, a sensed parameter (sensor metric) measured by a given sensor may be correlated to the sensor metric(s) measured by one or more other types of sensors such that an event detected by the given sensor can be picked up at varying levels by other sensors in the correlated group of sensors. For instance, a pump speed of the pump 122 is directly related to pump flow rate, power consumption, pressure rise across the pump 122, and absolute pressure at the outlet of the pump 122. If the pump speed reported by pump 122 increases, other correlated sensors should also register an increase. If a particular sensor in the correlated group of sensors does not register an increase, this could point to a malfunction with that particular sensor because there is a low likelihood that the single sensor is functioning properly while each of the other sensors is not.

For example, if the pump speed reported by the pump 122 increases and the upstream pressure reported by pressure sensor 120 also increases, but a corresponding increase in the pressure reported by pressure sensor 126 is not observed, then it could be possible that either the pump speed sensor for pump 122 or the pressure sensor 126 is not functioning properly. This determination can be made because it is known that the pump speed of pump 122 is correlated to the pressures both upstream and downstream of the pump 122. In this example scenario, additional correlated sensor metrics can be evaluated to ascertain which sensor is behaving anomalously. For instance, power consumption of the pump 122 (which is known to be correlated to pump speed) can be evaluated. If an increase is not observed in the power consumption of the pump 122, then the confidence increases that the pump speed reported for the pump 122 is not accurate. On the other hand, if the power consumption for pump 122 does exhibit an increase, this points more to an anomaly associated with the pressure reported by the pressure sensor 126.

CDUs such as CDU 100 are deployed to service significantly more expensive IT racks. Customers, however, are typically reluctant to deploy CDUs redundantly for cost-savings reasons. This reluctance introduces the risk that failure of relatively inexpensive equipment (a CDU) leads to failure of substantially more expensive equipment (IT racks). To compensate for this risk, CDU vendors have increased the amount of instrumentation in CDUs, both by increasing the redundancy of the instrumentation (e.g., redundant thermocouples, redundant pressure sensors, etc.) as well as by utilizing higher-quality or more expensive instrumentation. While high-quality and expensive instrumentation can improve CDU reliability, it also increases the computational requirements for the controller that receives and processes signals from the sensors as well as the storage/retrieval requirements for storage media (e.g., non-volatile memory such as read-only memory (ROM), electrically-programmable read-only memory (EPROM), flash memory, etc.) that stores the CDU firmware. In particular, the greater the level of instrumentation, the more complex the firmware needs to be. In addition, firmware for deployed CDUs needs to be periodically verified and upgraded, creating additional cost.

Example embodiments of the invention provide a technical solution to the technical problem associated with conventional CDU deployments of increased failure rates due to increased instrumentation and the resulting increased firmware complexity. This technical solution is achieved by using AI/ML multi-metric models to perform highly scalable, automatic, and high-speed anomaly detection for a single machine/system deployment and/or across multiple deployments within a cluster such that the complexity of the sensor instrumentation can be reduced, which in turn, results in simplified firmware and hardware, including a lower-cost and more reliable solution. The reduced complexity of the sensor instrumentation and the corresponding reduced complexity of the software/firmware for controlling the operation of such instrumentation yields the technical benefit of reduced system failure rates.

The use of AI/ML multi-metric models to achieve the above-described technical solution will now be described in more detail. While example embodiments disclosed herein are described primarily with respect to a CDU for providing a liquid-cooling function to IT racks, it should be appreciated that embodiments of the invention can be applied to any machine/system/subsystem with correlated groups of sensors to perform anomaly detection in a manner that enables a reduction in sensor instrumentation and a corresponding reduction in the complexity of software, firmware, processing hardware, or the like required to control the sensor instrumentation.

Figure 2:
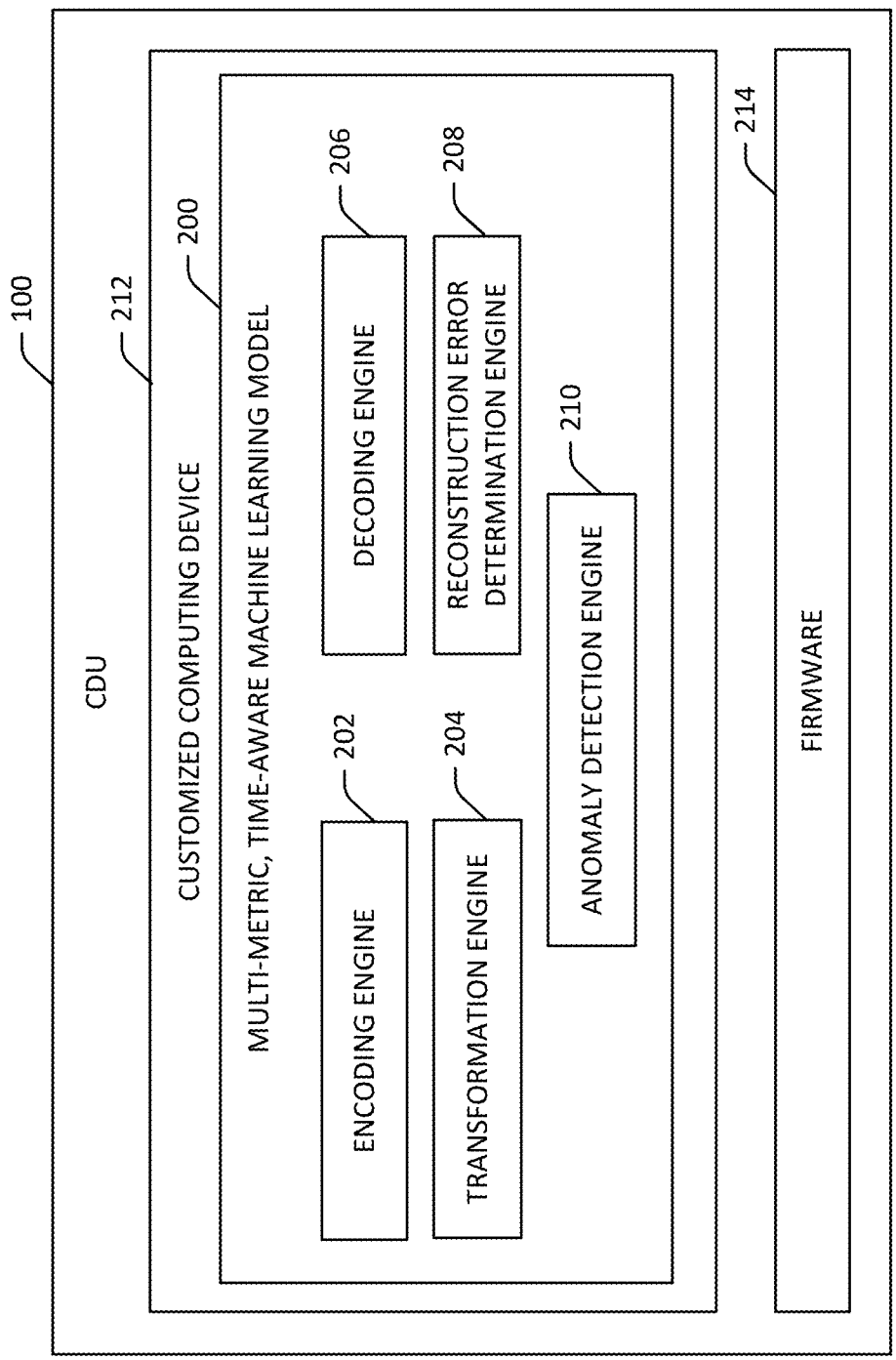
FIG. 2 depicts example computing engines of a multi-metric, time-aware machine learning model configured to identify anomalous behavior of a CDU according to example embodiments of the invention.
Figure 3:
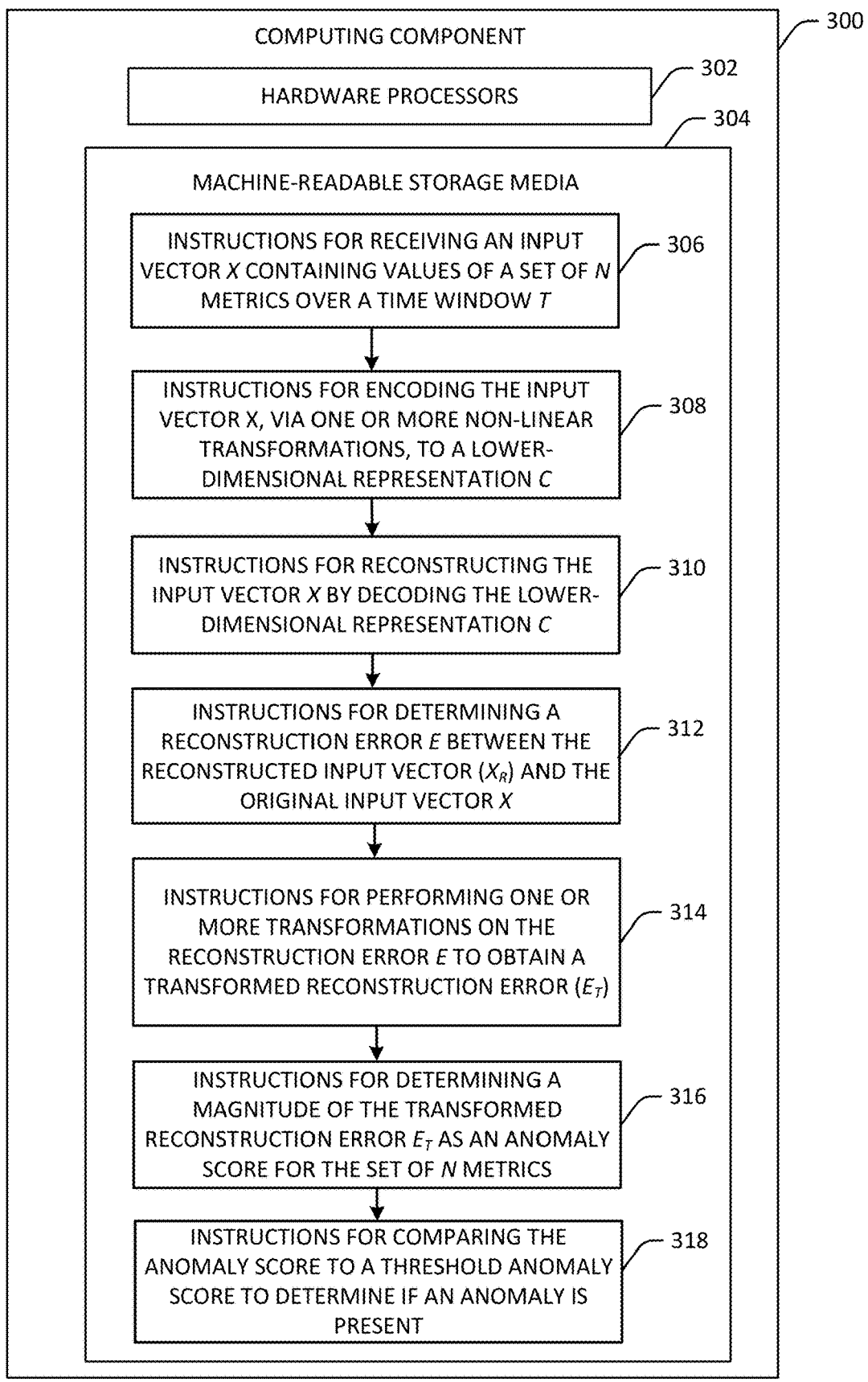
FIG. 3 depicts a set of executable instructions stored in machine-readable storage media that, when executed, cause an illustrative method to be performed for using a multi-metric, time-aware machine learning model to identify anomalous behavior of a CDU according to example embodiments of the invention.

FIG. 2 depicts example computing engines of a multi-metric, time-aware machine learning model 200 configured to identify anomalous behavior of a CDU according to example embodiments of the invention. FIG. 3 depicts a computing component 300 that includes one or more hardware processors 302 and machine-readable storage media 304 storing a set of machine-readable/machine-executable instructions that, when executed, cause the hardware processors 302 to perform a method for using a multi-metric, time-aware machine learning model to identify anomalous behavior of a CDU (e.g., CDU 100) according to example embodiments of the invention. FIGS. 2 and 3 will be described in conjunction with one another hereinafter.

In example embodiments, the machine-readable storage media 304 depicted in FIG. 3 may include the main memory 506, the read-only memory (ROM) 508, the storage 510, or any other suitable machine-readable storage media described herein. The instructions depicted in FIG. 3 as being stored on the machine-readable storage media 304 may be modularized into one or more computing engines such as those depicted in FIG. 2. In particular, each such computing engine may include a corresponding subset of the machine-readable and machine-executable instructions depicted in FIG. 3, such that when executed by the hardware processors 302, the instructions cause the hardware processors 302 to perform corresponding tasks/processing. In example embodiments, the set of tasks performed responsive to execution of the set of instructions forming part of a particular computing engine may be a set of specialized/customized tasks for effectuating a particular type/scope of processing.

Figure 5:
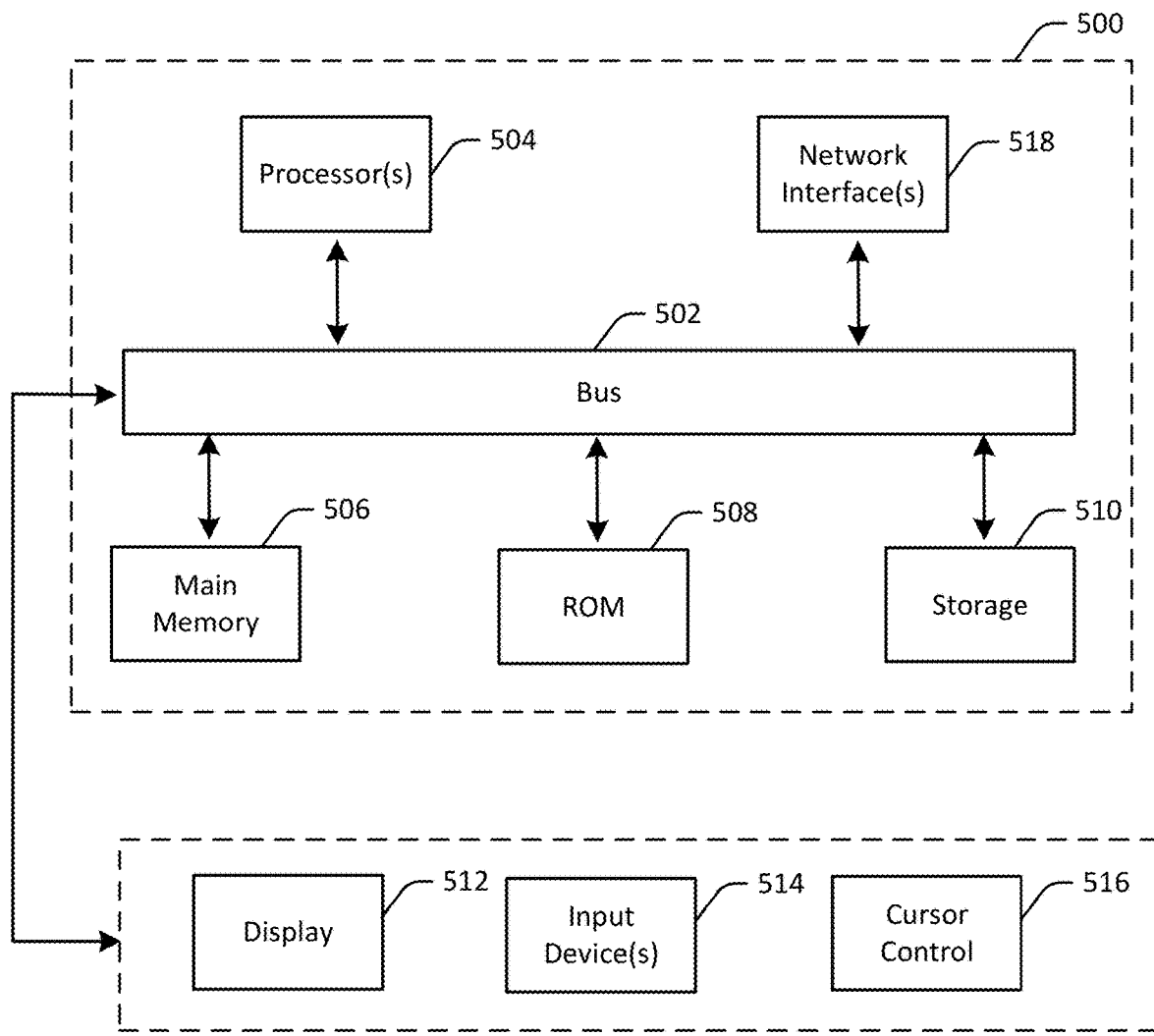
FIG. 5 is an example computing component that may be used to implement various features of example embodiments of the invention.

In example embodiments, the computing component 300 depicted in FIG. 3 may be, for example, the computing system 500 depicted in FIG. 5, or another computing device described herein. In some example embodiments, the computing component 300 may be a desktop computer; a laptop computer; a tablet computer/device; a smartphone; a personal digital assistant (PDA); a wearable computing device; or the like. In other example embodiments, the computing component 300 may be a server, a server cluster, or the like. In still other example embodiments, the computing component 300 may be a customized computing device 212 (FIG. 2) including, without limitation, a field programmable gate array (FPGA), an application specific integrated circuit (ASIC), a programmable logic controller (PLC), a programmable logic array (PLA), or the like. In yet other example embodiments, the computing component 300 may be the CDU 100 itself.

The hardware processors 302 may include, for example, the processor(s) 504 depicted in FIG. 5. In particular, the hardware processors 302 may include any suitable type of processing unit including, but not limited to, a central processing unit (CPU), a microprocessor, a Reduced Instruction Set Computer (RISC) microprocessor, a Complex Instruction Set Computer (CISC) microprocessor, a microcontroller, a System-on-a-Chip (SoC), a digital signal processor (DSP), an ASIC, an FPGA, a PLC, a PLA, and so forth. In some example embodiments, a single integrated device may constitute the computing component 300, the hardware processors 302, and the machine-readable storage media 304. For example, an ASIC, FPGA, a SOC, or the like may be the computing component 300 that also includes the hardware processors 302 for executing logic that is hardwired into the device and/or instructions stored in the storage media 304.

In example embodiments, the hardware processors 302 (or any other processing unit described herein) are configured to execute the various computing engines depicted in FIG. 2, which in turn, are configured to provide corresponding functionality in connection with AI/ML-enabled anomalous behavior detection for a system such as the CDU 100. In particular, the hardware processors 302 may be configured to execute an encoding engine 202, a transformation engine 204, a decoding engine 206, and a reconstruction error determination engine 208. In example embodiments, these engines may form part of multi-metric, time-aware machine learning model 200 (referred to hereinafter as ML model 200). The ML model 200 may be/utilize any suitable type of AI/ML model/algorithm including, without limitation, regression-based models (e.g., decision trees, random forests, artificial neural networks, etc.); classification-based models (e.g., support vector machines, Bayesian inference, etc.); unsupervised learning models such as clustering-based models (e.g., k-means clustering); and so forth.

While the ML model 200 is depicted as being implemented on the customized computing device 200, it should be appreciated that the ML model 200 and its constituent engines can be implemented in any combination of hardware, software, and/or firmware. In some example embodiments, one or more of these engines can be implemented, at least in part, as software and/or firmware modules that include the computer-executable/machine-executable instructions stored in the machine-readable storage media 304 and executable by the hardware processors 302. It should be appreciated that any description herein of an engine performing a function inherently encompasses the function being performed responsive to computer-executable/machine-executable instructions of the engine being executed by a processor.

While the ML model 200 and its constituent computing engines are depicted in FIG. 2 as being distinct from firmware 214 of the CDU 100, in some example embodiments, the ML model 200 may, in fact, be embedded in the firmware 214. More specifically, in some example embodiments, the ML model 200 may be integrated with the existing firmware 214 of the CDU 100. Regardless of whether the ML model 200 is independent of the CDU firmware 214 or integrated therewith, the AI capabilities provided by the ML model 200 enable a reduction in the complexity of the sensor instrumentation for the CDU 100, and as a result, enable a reduction in the complexity of the firmware 214. As noted earlier, this, in turn, achieves the technical benefit of a lower failure rate for the CDU 100.

Referring now to FIG. 3 in conjunction with FIG. 2, at block 306, machine-executable instructions of the ML model 200 may be executed by the hardware processors 302 to cause an input vector X to be received. The input vector X may take the following form: $X=[x_0^1, x_1^1, \ldots, x_N^1, \ldots, x_0^T, x_1^T, \ldots, x_N^T]$. That is, the input vector X may include values captured for N sensor metrics at various points in time over the course of a temporal window of duration T. As previously noted, the N sensor metrics may include one or more groups of correlated sensor metrics that exhibit similar behavior in response to changes in the characteristics being sensed.

In example embodiments, the ML model 200 is capable of identifying single or multi-metric point, contextual, and/or collective anomalies associated with operation of the CDU 100. Some traditional anomaly detection approaches assume a concrete probability distribution of metric values such as a multi-variate Gaussian distribution. For such distributions, if the values of the metrics fall below a certain threshold given the parameters of the distribution, then the values are determined to be anomalous. In the case of CDUs, however, such assumptions may not be warranted. In particular, due to the nature of the physical processes within the CDU 100 that the sensor metrics represent, the assumption that the metrics follow a Gaussian distribution may not be accurate. For example, pump speed is a categorical metric that takes on values from a discrete set of values, and thus, may not be appropriately characterized by a Gaussian distribution. As such, in example embodiments, the ML model 200 may be any suitable machine learning model/algorithm (e.g., a neural network-based approach such as autoencoders) that is configured to learn the expected behavior of joint metrics.

Still referring to FIG. 3 in conjunction with FIG. 2, at block 308, machine-executable instructions of the encoding engine 202 may be executed by the hardware processors 302 to cause the input vector X to be encoded to obtain a lower-dimensional representation C of the input vector X. In particular, a dimensionality/magnitude of the lower-dimensional representation C (given by |C|) may be less than a dimensionality/magnitude of the input vector X (given by |X|), that is, |C|<|X|. Encoding the input vector X to obtain the encoded lower-dimensional representation C may include a loss of at least some of the information (e.g., sensor metric values) in the input vector X. In example embodiments, also at block 308, machine-executable instructions of the transformation engine 204 may be executed by the hardware processors 302 to cause a series of one or more non-linear transformations to be performed on the input vector X as part of the encoding process.

In addition, in some example embodiments, values corresponding to one or more sensor metrics may be discarded from the input vector X prior to performing the encoding. This discarding of values may be made possible because the ML model 200 enables anomalous behavior detection and a high level of resiliency despite the deployment of a fewer number of sensors. Thus, sensor metric values corresponding to one or more sensors may be discarded from the input vector X, while still maintaining the capability to perform the desired anomalous behavior detection. In some example embodiments, the discarding of sensor metric values may result from the corresponding sensor(s) no longer being deployed (e.g., the elimination of redundancy for one or more sensors). In other example embodiments, sensor metric values for a particular sensor that is no longer deployed may simply be absent from the input vector X. It should be appreciated that the discarding of sensor metric values (or the absence of such values) is distinct from the loss of information that may occur as a result of the encoding of the input vector X.

At block 310, machine-executable instructions of the decoding engine 206 may be executed by the hardware processors 302 to cause the input vector X to be reconstructed to obtain a reconstructed input vector $X_R$. Reconstructing the input vector X may include decoding the encoded lower-dimensional representation C. In particular, the reconstructed input vector $X_R$ may be given by:

$X_R$=decode(encode (X)). In example embodiments, the ML model 200 may be trained on a dataset that contains few or no anomalous data points, and thus, the ML model 200 may learn to reconstruct metric values associated with normal operational behavior of the CDU 100, but may be unable to properly reconstruct values for a dataset containing a large amount of anomalous data. As such, due to the nature of the training performed on the ML model 200 as well as the lower-dimensionality of the encoded representation C with respect to the input vector X and the corresponding loss of information when generating the encoded representation, the extent to which the reconstructed input vector $X_R$ deviates from the original input vector X may be directly related to amount of anomalous data in the input vector X.

At block 312, machine-executable instructions of the reconstruction error determination engine 208 may be executed by the hardware processors 302 to cause a reconstruction error (E) to be determined between the input vector X and the reconstructed input vector $X_R$. In some example embodiments, the reconstruction error E may be an error vector given by $E=X_R-X$. More generally, the reconstruction error E may be any quantity that represents the extent to which the reconstructed input vector $X_R$ deviates from the initial input vector X. As previously noted, the more anomalous data contained in the input vector X, the more deviation there will be between the reconstructed input vector $X_R$ and the original input vector X.

At block 314, machine-executable instructions of the transformation engine 204 may be executed by the hardware processors 302 to cause one or more transformations to be performed on the reconstruction error E to obtain a transformed reconstruction error $E_T$. In example embodiments, the transformation engine 204 may subject the reconstruction error vector E to one or more whitening transformations to obtain the transformed reconstruction error vector $E_T$. In some example embodiments, the whitening transformation(s) may cause elements of the reconstruction error vector E corresponding to two or more sensor metrics to become uncorrelated in the transformed reconstruction error vector $E_T$. In addition, the whitening transformation(s) may result in elements of the transformed reconstruction error vector $E_T$ having the same variance.

At block 316, machine-executable instructions of the anomaly detection engine 210 may be executed by the hardware processors 302 to cause an anomaly score to be determined from the transformed reconstruction error vector $E_T$. In example embodiments, the anomaly score for the initial input vector X may be determined as the magnitude of the transformed reconstruction error vector $E_T$. In other example embodiments, the anomaly score may be any linear combination of the elements of the transformed reconstruction error vector $E_T$.

At block 318, machine-executable instructions of the anomaly detection engine 210 may be executed by the hardware processors 302 to cause the anomaly score generated at block 316 to be compared to a threshold anomaly score to determine if an anomaly is present. In example embodiments, an anomaly may correspond to multiple sensor metrics having values indicative of anomalous behavior. However, because of the correlation between multiple sensor metrics, even though anomalous behavior may be indicated by the values of multiple sensor metrics, a lesser number of sensors/components of the CDU 100 may actually be operating anomalously than the number of sensors that generated the anomalous values. In example embodiments, the threshold anomaly score may be determined from a distribution of multi-metric anomaly scores generated from the training dataset used to train the ML model 200. In some example embodiments, the distribution of multi-metric scores used to determine the threshold anomaly score may be a chi-squared distribution. The threshold anomaly score may be, for example, a value that is selected such that a desired percentage of values in the distribution of multi-metric anomaly scores falls below the selected value.

In example embodiments, the relative numbers of correlated sensors that register anomalous values can indicate whether it is more likely that a CDU (e.g., a flow regulating component of the CDU) is experiencing anomalous behavior or a sensor is exhibiting the anomalous behavior. In certain example embodiments, if at least a minimum number of a group of correlated sensors register values that exceed anomaly thresholds, there may be a greater likelihood that the system (e.g., one or more components of the system are failing or otherwise not functioning properly) is exhibiting anomalous behavior rather than the sensors. Even in example scenarios in which some minimum number of correlated sensors are registering anomalous values, one or more sensors in the group of correlated sensors may, at the time same, be behaving anomalously (e.g., malfunctioning). For instance, if among a group of five correlated sensors, four of the sensors are registering values that exceed respective threshold values, but one sensor is not, this may indicate 1) that a system-level fault event is being registered by the four sensors with anomalous values and 2) that the fifth sensor is also experiencing a fault event because it is behaving anomalously by not registering the system-level event.

In some example embodiments, it may be determined that a sensor in a group of correlated sensors is exhibiting anomalous behavior if 1) it registers a value for a sensor metric that exceeds a threshold value (or that is otherwise outside of an expected range for the sensed value) and 2) at least a minimum number of other sensors in the group of correlated sensors do not exceed respective threshold values. In particular, the fact that other sensors in the group of correlated sensors do not register an anomaly event, points to a greater likelihood that the sensor that does register an anomalous value is itself behaving anomalously. For instance, if a first sensor among a group of five correlated sensors has an anomalous value, but three other sensors in the group do not, then there may be a greater likelihood that the first sensor is exhibiting anomalous behavior.

In example embodiments, an alert may be generated to inform an operator of the detected anomalous behavior. For instance, the alert may indicate that a system-level fault may be present based on at least a minimum number of correlated sensors registering respective values that exceed respective threshold values. The alert may further identify one or more potential system-level causes for the observed behavior (e.g., malfunctioning flow regulating component). In other example embodiments, such as those in which a sensor is determined to be more likely to be exhibiting anomalous behavior, the alert may include an indication of the potentially malfunctioning sensor. Based on the alert, an operator may inspect the sensor and values measured by the sensor may potentially be discarded if the sensor is determined to be functioning improperly. The sensor may be placed online again once it is repaired or replaced.

In some example embodiments, a threshold value against which a sensor metric value is compared to determine if the measured metric value exceeds the threshold value, and thus, is registering an anomaly, may be a dynamic value that can change based on one or more other parameters. In particular, a threshold value may be established based on training data provided to a multi-variate AI/ML model, and may change based on changes to one or more operational parameters, as reflected in the training data. For instance, as an outside temperature fluctuates, the threshold value against which the coolant temperature is compared in order to identify an anomaly may also change. More specifically, if, for example, the outside temperature decreases, then an expected coolant temperature may also decrease, in which case, the anomaly threshold value may also decrease. Conversely, if the outside temperature increases, an expected range of values for the coolant temperature may also increase, in which case, the anomaly threshold may increase. It should be appreciated that numerous other examples are contemplated.

Figure 4A:
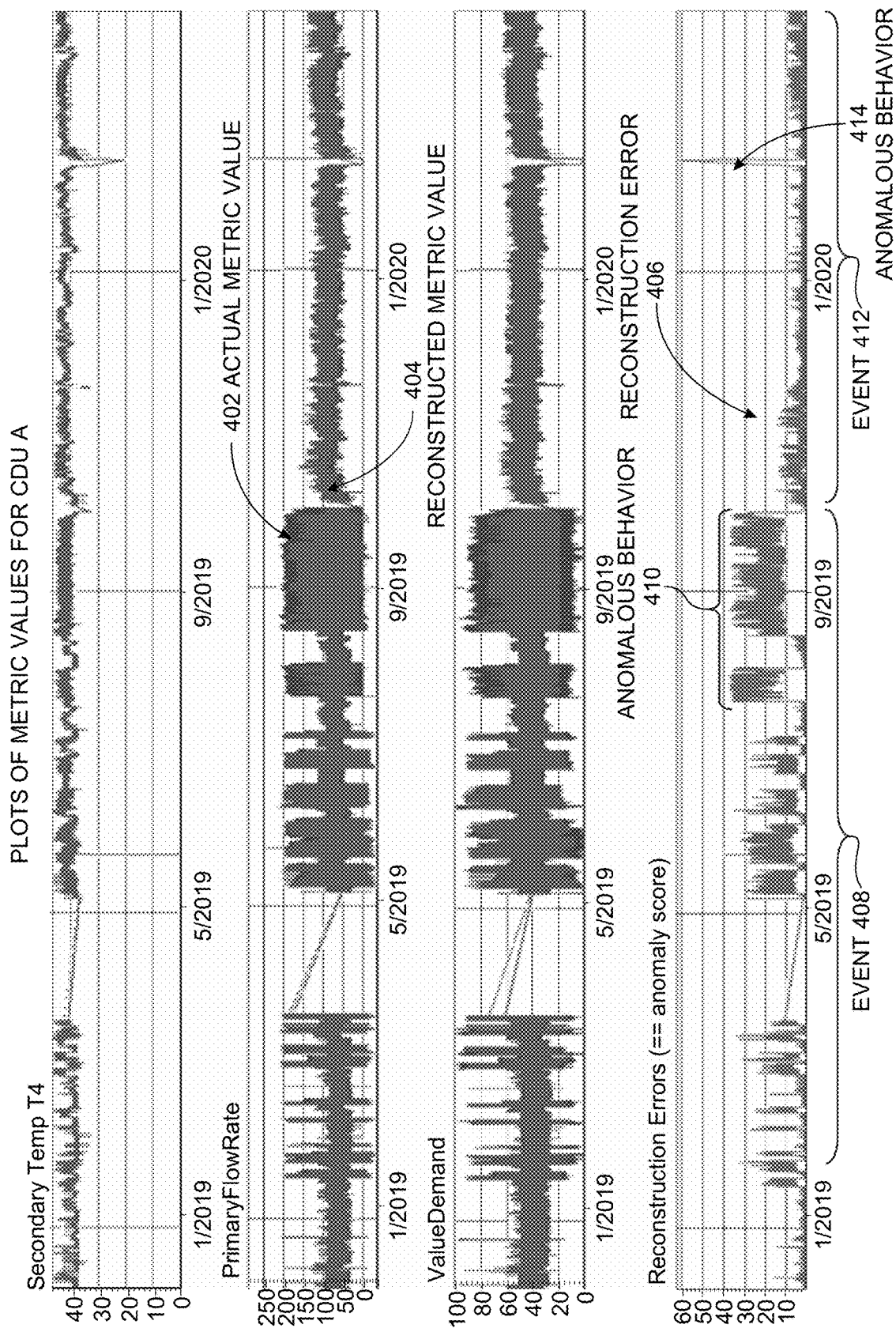
FIG. 4A illustrates plots of example actual sensor metric values measured over time for a first CDU as well as corresponding reconstructed metric values and reconstruction errors according to example embodiments of the invention.

FIG. 4A illustrates plots of example actual sensor metric values measured over time for a CDU A (e.g., CDU 100) as well as corresponding reconstructed metric values and reconstruction errors according to example embodiments of the invention. FIG. 4A illustrates plots of actual values and corresponding reconstructed values for three example sensor metrics, specifically, secondary temperature of the secondary flow 106 as measured by thermocouple 130 (FIG. 1); primary coolant flow rate; and valve position (valve demand). These sensor metrics may be correlated metrics that exhibit similar behavior in relation to registered events.

For each sensor metric, the plots include the actual values captured for the sensor metric as well as the reconstructed values. As illustratively labeled with respect to the primary coolant flow rate metric, the actual metric values 402 are shown in slightly darker shading than the reconstructed values 404. Moreover, the reconstruction error 406 determined with respect to all of the correlated sensor metrics is shown below the plots of the actual metric values and reconstructed values for each sensor metric.

There are various periods of time during which all three sensors that capture the sensor data relating to the example metrics depicted in FIG. 4A register an event, which is then accompanied by an anomaly score that exceeds an anomaly threshold. In example embodiments, this is interpreted as anomalistic behavior. One such event 408 is depicted in FIG. 4A. The event 408 may correspond, for example, to a water regulating valve on the primary side of CDU A that anomalously opens and closes (referred to as "valve demand") outside of its specified range, which in turn, causes the temperature registered by the thermocouple 130 and primary coolant flow rate to simultaneously cycle. The anomalous cycling behavior 410 of the water regulating valve, which in turn, caused corresponding cycling in other correlated sensor metrics resulted in an anomaly score that exceeds the anomaly threshold, thereby indicating the presence of an anomaly.

The anomaly score determined based on the reconstruction error 406 is a multi-metric score for all of the sensor correlated metrics referenced in FIG. 4A (temperature of the secondary flow 106; primary coolant flow rate; valve demand). Multi-metric models such as ML model 200 that generate multi-metric anomaly scores provide a number of technical benefits over their single-metric counterparts. In particular, multi-metric models are more robust than single-metric model, produce fewer false alarms, and significantly reduce the amount of information that data center operators need to process. Moreover, multi-metric models are capable of leveraging the correlation between sensors within a group of correlated sensors. For instance, if any of the metrics in FIG. 4A was removed from the multi-metric analysis, the ML model 200 would have still flagged the anomalous behavior. This demonstrates that even if a sensor stops functioning properly, the anomalous behavior associated with event 408 would still have been flagged. For example, even if the valve demand sensor stops functioning, the temperature of the secondary flow 106 and the primary coolant flow rate would still exhibit the anomalous cycling behavior, and the reconstruction error would still deviate from the anomaly threshold so as to indicate the presence of an anomaly. In this manner, employing the ML model 200 for anomalous behavior detection enables the deployment of fewer sensors and less expensive instrumentation, while still maintaining a high level of system resiliency.

It should be appreciated that while the anomaly score (as determined from the reconstruction error 406) during a portion of the time period corresponding to event 408 exceeds the anomaly threshold, and thus, exhibits anomalous behavior 410, this does not necessarily indicate that multiple sensors or multiple other components of CDU A are not functioning properly. For example, in the case of event 408, while each of the example sensors generated anomalistic data for their corresponding sensor metrics, the only component of the CDU 100 that was malfunctioning was the water regulating valve on the primary side. Because, however, the valve demand metric for the water regulating valve is correlated to multiple other sensor metrics, anomalistic data may also be observed in connection with other sensor metrics even though the sensors capturing data relating to those other metrics are functioning properly. As such, in some example embodiments, the detection of anomalistic behavior among a group of correlated sensor metrics may require further investigation as to the sensor/component that is malfunctioning and causing the other sensor metrics to exhibit anomalistic behavior. Further, in example embodiments, if a sensor is not functioning properly, the data from that sensor can be replaced with historical or predicted values prior to input to the ML model 200.

Another example of the capability of the multi-variate ML model 200 to enhance CDU resiliency will now be described with respect to FIGS. 4A and 4B. Referring first to FIG. 4A, another example event 412 may correspond to a server or IT rack cooled by CDU A being powered down for a servicing event. This shutdown event 412 may result in anomalistic data for the various example sensor metrics depicted in FIG. 4A, and ultimately an anomaly score that exceeds the anomaly threshold, thereby indicating anomalous behavior 414. In example embodiments, the event 412 may be a facility-level event.

Figure 4B:
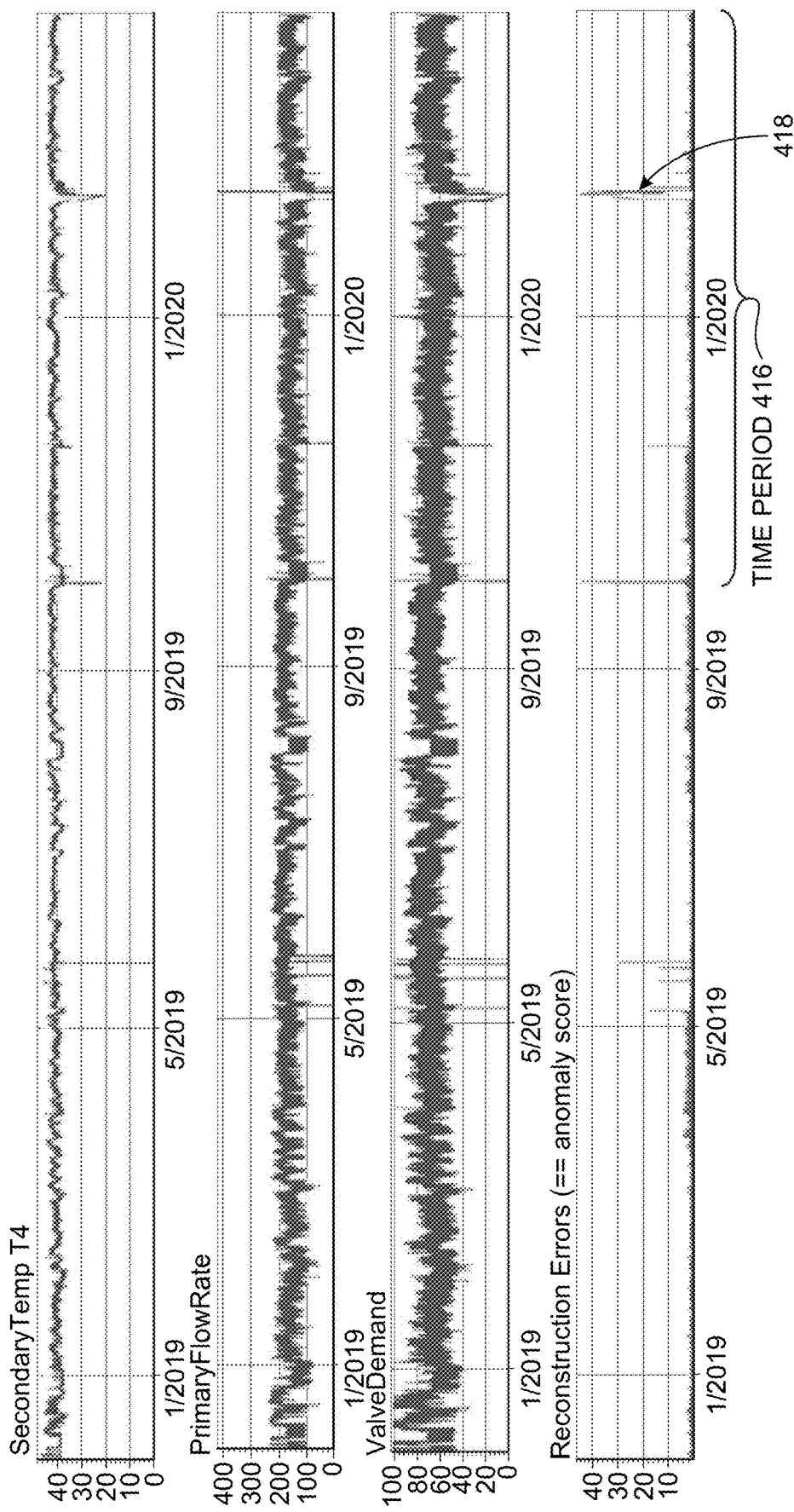
FIG. 4B illustrates plots of example actual sensor metric values measured over time for a second CDU in a same cluster as the first CDU as well as corresponding reconstructed metric values and reconstruction errors according to example embodiments of the invention.

FIG. 4B illustrates plots of actual sensor metric values as well as corresponding reconstructed values and reconstruction errors for the same example set of sensor metrics as those depicted in FIG. 4A, but for a different CDU (CDU B). CDU B may be, for example, in a same cluster as CDU A. CDU A and CDU B may experience the same facility-level event 412, and may execute the same or different multi-variate anomaly detection models. As shown in FIG. 4B, the reconstruction error during a time period 416 overlapping with the time period of event 412 exhibits anomalous behavior 418 similar to the anomalous behavior 414. FIGS. 4A and 4B illustrate that a multi-variate model deployed on two or more CDUs is capable of detecting a facility level anomaly. This yields the technical benefit of achieving another level of sensor health verification. For instance, if facility level anomalous behavior is observed from 4 CDUs in a group of 5, and that same facility level behavior is not observed in CDU 5, then we can potentially ascertain that a sensor failure has occurred in CDU 5 given it is the only CDU that failed to detect the facility level anomalous behavior. Moreover, another technical benefit of employing the ML model 200 for anomalous behavior detection, is that the same ML model 200 can be used not only for a given CDU (e.g., CDU A), but can be deployed across other CDUs deployed within a same cluster (e.g., CDU B). Thus, the ML model 200 can be employed to improve the resiliency of both individual and cluster-wide CDU deployments, while simultaneously enabling simplified CDU instrumentation and associated firmware.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method, comprising:
   receiving, as input to a machine learning model, sensor data captured over a time window by a plurality of sensors configured to monitor an operational behavior of a machine, the sensor data comprising a respective plurality of values for each of a plurality of sensor metrics;
   identifying a set of two or more sensor metrics of the plurality of sensor metrics that are correlated;
   encoding, using the machine learning model, the sensor data to obtain an encoded representation of the sensor data;
   reconstructing, using the machine learning model, the sensor data from the encoded representation to obtain reconstructed sensor data; and
   determining, using the machine learning model, whether the machine or at least one sensor is more likely to be exhibiting anomalous behavior based at least in part on a number of the two or more correlated sensor metrics having respective values that exceed respective threshold values and a difference between the reconstructed sensor data and the sensor data.

2. The computer-implemented method of claim 1, further comprising:
   initiating one or more remedial measures to alter the operational behavior of the machine in response to the anomalous behavior.

3. The computer-implemented method of claim 1, wherein determining whether the machine or the at least one sensor is more likely to be exhibiting the anomalous behavior comprises:
   determining that at least one correlated sensor metric exceeds a respective threshold value;

determining that at least a minimum number of the correlated sensor metrics do not exceed respective threshold values; and determining that the at least one sensor is more likely to be exhibiting the anomalous behavior than the machine.

4. The computer-implemented method of claim 1, wherein determining whether the machine or the at least one sensor is more likely to be exhibiting the anomalous behavior comprises:

determining that at least a minimum number of the two or more correlated sensor metrics exceed respective threshold values; and determining that the machine is more likely to be exhibiting the anomalous behavior than the particular sensor.

5. The computer-implemented method of claim 1, further comprising:

determining, using the machine learning model, a reconstruction error based on the difference between the reconstructed sensor data and the sensor data; and determining, using the machine learning model, an anomaly score from the reconstruction error.

6. The computer-implemented method of claim 5, wherein the reconstruction error is an error vector, and wherein determining the anomaly score comprises determining a magnitude of the error vector.

7. The computer-implemented method of claim 5, further comprising:

determining that the anomaly score exceeds a threshold score; and determining that one of the machine or the at least one sensor is exhibiting the anomalous behavior based at least in part on the anomaly score exceeding the threshold score.

8. The computer-implemented method of claim 5, wherein the two or more correlated sensor metrics comprise a first sensor metric and a second sensor metric, and wherein the reconstruction error comprises a first set of values corresponding to the first sensor metric and a second set of values corresponding to the second sensor metric, the method further comprising:

performing a transformation on the reconstruction error that results in the first set of values becoming uncorrelated from the second set of values.

9. The computer-implemented method of claim 1, further comprising:

determining that the at least one sensor is exhibiting the anomalous behavior; and discarding, from the sensor data prior to providing the sensor data as input to the machine learning model, the respective plurality of values generated by the at least one sensor and corresponding to at least one of the plurality of sensor metrics.

10. The computer-implemented method of claim 9, wherein the discarding occurs in response to the at least one sensor no longer being configured to monitor the operational behavior of the machine.

11. A machine learning-enabled system, comprising:

a plurality of sensors configured to monitor an operational behavior of the system;

a memory storing machine-executable instructions; and a processor configured to access the memory and execute the machine-executable instructions to:

receive sensor data captured by the plurality of sensors over a time window, the sensor data relating to a plurality of correlated sensor metrics;

encode the sensor data to obtain encoded sensor data;

decode the encoded sensor data to obtain reconstructed sensor data; and determine, using a machine learning model, whether the system or at least one sensor is more likely to be exhibiting anomalous behavior based at least in part on a number of the plurality of correlated sensor metrics having respective values that exceed respective threshold values during the time window, and a difference between the reconstructed sensor data and the sensor data.

12. The system of claim 11, wherein the processor is configured to determine whether the machine or the at least one sensor is exhibiting the anomalous behavior by executing the computer-executable instructions to:

determine that at least one correlated sensor metric exceeds a respective threshold value;

determine that at least a minimum number of the correlated sensor metrics do not exceed respective threshold values; and determine that the at least one sensor is more likely to be exhibiting the anomalous behavior than the machine.

13. The system of claim 11, wherein the processor is configured to determine whether the machine or the at least one sensor is exhibiting the anomalous behavior by executing the computer-executable instructions to:

determine that at least a minimum number of the two or more correlated sensor metrics exceed respective threshold values; and determine that the machine is more likely to be exhibiting the anomalous behavior than the at least one sensor.

14. The system of claim 11, wherein the processor is configured to encode the sensor data to obtain the encoded sensor data by executing the machine-executable instructions to:

apply one or more non-linear transformations to the input sensor data to obtain the encoded sensor data, wherein the encoded sensor data is a lower-dimensional representation of the sensor data.

15. The system of claim 11, wherein the processor is further configured to execute the machine-executable instructions to:

determine a reconstruction error based on a difference between the reconstructed sensor data and the sensor data; and determine an anomaly score from the reconstruction error.

16. The system of claim 15, wherein the processor is further configured to execute the computer-executable instructions to:

determine that the anomaly score exceeds a threshold score; and determine that one of the system or the at least one sensor is exhibiting the anomalous behavior based at least in part on the anomaly score exceeding the threshold score.

17. A computer program product comprising a non-transitory computer readable medium storing program instructions that, when executed by a processor, cause operations to be performed comprising:

receiving, by a machine learning model, an input vector comprising sensor measurements captured by a plurality of sensors monitoring an operational status of a machine, the sensor measurements relating to a plurality of correlated sensor metrics;

encoding, using the machine learning model, the sensor measurements to obtain an encoded representation of the sensor measurements;

reconstructing, using the machine learning model, the sensor measurements from the encoded representation to obtain reconstructed sensor measurements; and determining, using the machine learning model, whether the machine or at least one sensor is more likely to be exhibiting anomalous behavior based at least in part on a number of the sensor measurements relating to the plurality of correlated sensor metrics that exceed respective threshold values for the plurality of correlated sensor metrics, and a difference between the reconstructed sensor measurements and the sensor measurements.

18. The computer program product of claim 17, wherein determining whether the machine or the at least one sensor is more likely to be exhibiting the anomalous behavior comprises:

determining that at least a threshold number of the plurality of correlated sensor metrics deviate from respective expected values by more than respective threshold amounts; and determining that the machine is more likely to be exhibiting the anomalous behavior than the at least one sensor.

\* \* \* \* \*